H. H. EATON.
MACHINE FOR MAKING LACING HOOKS.
APPLICATION FILED JULY 31, 1903.

936,430.

Patented Oct. 12, 1909.
5 SHEETS—SHEET 1.

Witnesses
Edwin F. Samuels
Farnum F. Dorsey

Inventor
Harrison H. Eaton
by his Attorneys
Phillip Van Everen & Fish

H. H. EATON.
MACHINE FOR MAKING LACING HOOKS.
APPLICATION FILED JULY 31, 1903.

936,430.

Patented Oct. 12, 1909.
5 SHEETS—SHEET 2.

Witnesses
Edwin F. Samuels
Farnum F. Dorsey

Inventor
Harrison H. Eaton
by his Attorneys
Phillips Van Everen & Fish

H. H. EATON.
MACHINE FOR MAKING LACING HOOKS.
APPLICATION FILED JULY 31, 1903.

936,430.

Patented Oct. 12, 1909.
5 SHEETS—SHEET 3.

Witnesses
E. durn F. Samuels
Farnum F. Dorsey

Inventor
Harrison H. Eaton
by his Attorneys
Phillips Van Everen & Fish

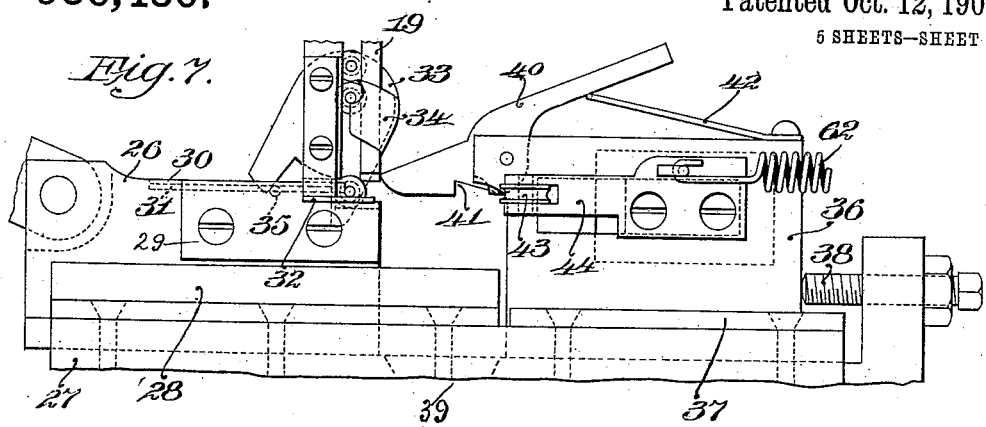

UNITED STATES PATENT OFFICE.

HARRISON H. EATON, OF WINCHESTER, MASSACHUSETTS, ASSIGNOR TO UNITED SHOE MACHINERY COMPANY, OF PATERSON, NEW JERSEY, A CORPORATION OF NEW JERSEY.

MACHINE FOR MAKING LACING-HOOKS.

936,430. Specification of Letters Patent. Patented Oct. 12, 1909.

Application filed July 31, 1903. Serial No. 167,670.

*To all whom it may concern:*

Be it known that I, HARRISON H. EATON, a citizen of the United States, residing at Winchester, in the county of Middlesex and State of Massachusetts, have invented certain new and useful Improvements in Machines for Making Lacing-Hooks; and I do hereby declare the following to be a full, clear, and exact description of the invention, such as will enable others skilled in the art to which it appertains to make and use the same.

The present invention relates to machines for making lacing hooks and more particularly to machines for making lacing hooks which comprise a shank which passes through the material to which the hook is secured and a body portion bent into the desired shape to receive the lacing cord.

Figure 3:

The object of the present invention is to provide a machine for bending the body portion of the hook into the desired shape, the embodiment of the invention hereinafter described being designed to form two curvatures in the body portion of a blank similar to that disclosed in Figure 3 of my prior patent for an improved lacing hook for shoes, No. 11,874, reissued November 27, 1900, and produce a lacing hook substantially similar to that disclosed in Figs. 4, 5 and 6 of said patent.

Figure 4:
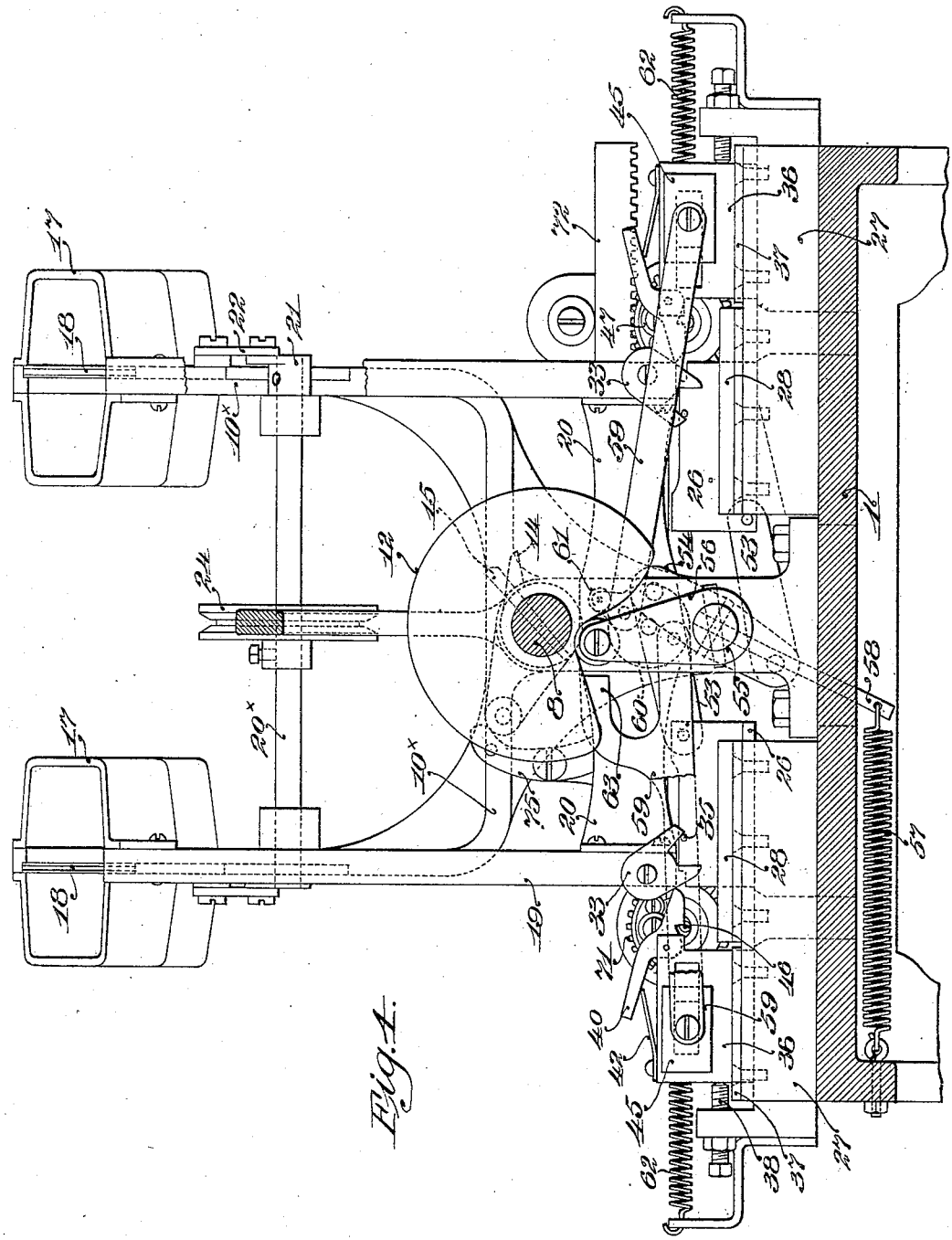
Figure 5:
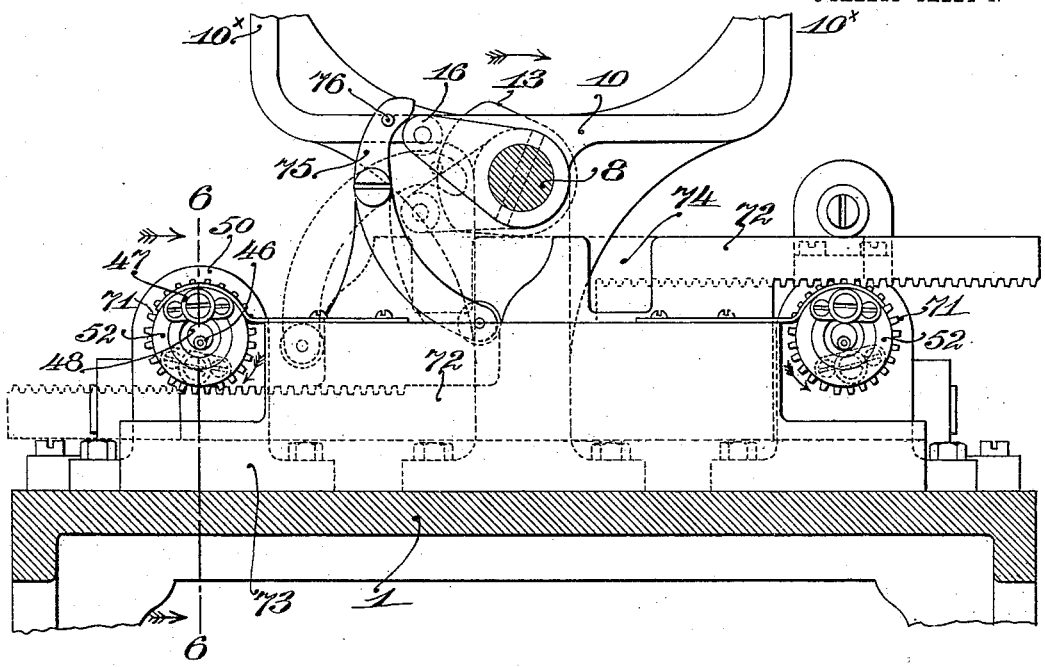
Figure 6:
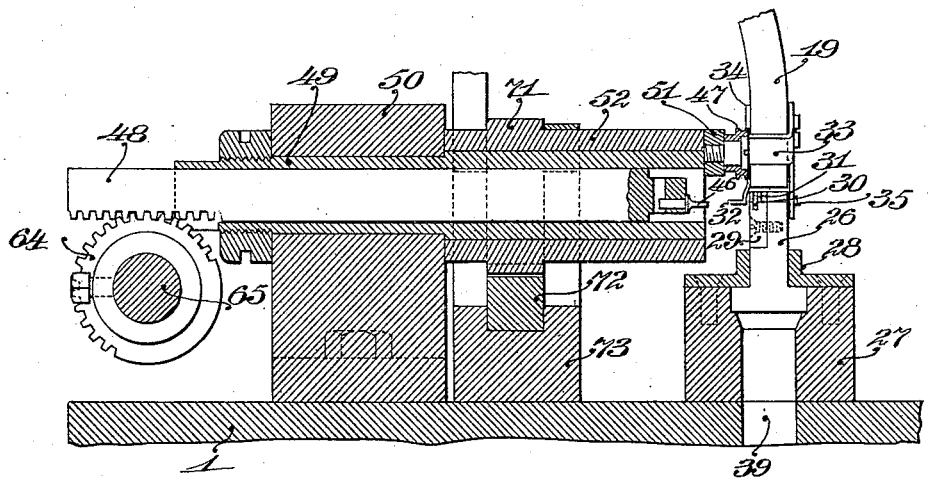

The body portion of the hook disclosed in Figs. 4, 5 and 6 of the patent above referred to is provided with two main curvatures angularly disposed with relation to each other, one curvature lying substantially in a plane passing through the axis of the shank of the hook, and the other curvature lying in a plane substantially at right angles to the axis of the shank of the hook. The machine hereinafter described as embodying the preferred form of my invention is adapted to form these two curvatures in the body portion of the hook, the two curvatures being disposed at right angles with relation to each other. It is to be understood, however, that my invention broadly considered is not limited to a machine which is adapted to form two curvatures in the body portion of a hook arranged at right angles to each other but contemplates forming in any desired order two curvatures in the body portion of the hook disposed at any desired angle with relation to each other so that the body portion of the hook assumes a shape which adapts it to receive the lacing cord. It is also to be understood that while I have disclosed my invention as embodied in a machine adapted to operate upon separate blanks similar to the blanks shown in Figs. 2 and 3 of the patent hereinbefore referred to, my invention broadly considered is not limited to a machine arranged to operate upon the specific form of blank illustrated in said patent or upon separate blanks, but that it may be embodied in a machine adapted to operate upon other forms of separate blanks or upon a blank before it is separated from the end of a wire or rod.

In carrying out the broad principle of my invention, I have provided a machine with bending devices which are arranged to act successively upon the body portion of the blank to form therein two curvatures angularly disposed with relation to each other and this machine in addition to the broad principle of invention also embodies other features of invention hereinafter described and claimed, the advantages of which will be obvious to those skilled in the art from the following description, it being understood that these features of invention, except as specifically recited in the claims, are not limited to any particular construction or arrangement of parts.

In the machine illustrated in the drawing accompanying this application the body portion of the blank is acted upon successively by two bending mechanisms, one of which acts to bend the body portion of the blank at an angle to the shank and the other mechanism thereafter acts to bend the body portion of the blank to form a curvature therein angularly disposed to the first curvature. During the action of the bending mechanisms the blank is held by means of holding devices with its body portion projecting therefrom; the holding devices remaining stationary while the bending mechanisms act successively upon the body portion of the blank. The machine is entirely automatic in its operation, automatic mechanism being provided for bringing the blanks into a position to be acted upon by the bending mechanism and for discharging the completed hooks from the machine. The blanks operated on by the machine are similar to the blanks illustrated in Figs. 2, 3 and 4 of the patent hereinbefore referred to. The automatic mechanism for bringing the blanks into a position to be acted upon by the bending mechanisms comprises a hopper in which the blanks are placed in bulk, a raceway leading from a hopper, a lifting plate for raising a number of blanks from the hopper and discharging them into the raceway and a feeding plunger arranged to reciprocate across the lower end of the raceway. At each reciprocation of the feeding plunger a blank is fed into a position to be acted upon by the bending mechanisms. During the action of the bending mechanism the blank is held by means of the feeding plunger and a stationary holding device coöperating therewith. One of the bending mechanisms comprises a bending device which is actuated to engage the projecting body portion of the blank and to bend it into a plane substantially at right angles to the shank. The other bending mechanism comprises a former, which, after the body portion of the blank has been bent by the first bending mechanism, is moved into a position to be engaged by the body portion of the blank and a bending device which is rotated about the former to bend the body portion of a blank around the same.

The machine is designed to bend both right and left hooks and to this end is provided with two sets of bending devices one of which is arranged to bend a blank to form a right hook and the other to bend a blank to form a left hook. The machine is also provided with two hoppers, a raceway leading from each hopper and with a feeding plunger at the lower end of each raceway arranged to feed a blank therefrom into a position to be acted upon by one of the sets of bending devices. Both sets of bending devices and the feed plungers for feeding blanks into a position to be acted upon thereby are actuated through suitable connections from the same cams on the cam shaft of the machine.

The specific construction of the devices and mechanism above referred to will be clearly understood from the following description taken in connection with the accompanying drawings in which is illustrated a hook bending machine embodying the various features of my invention in their preferred form.

Figure 1:
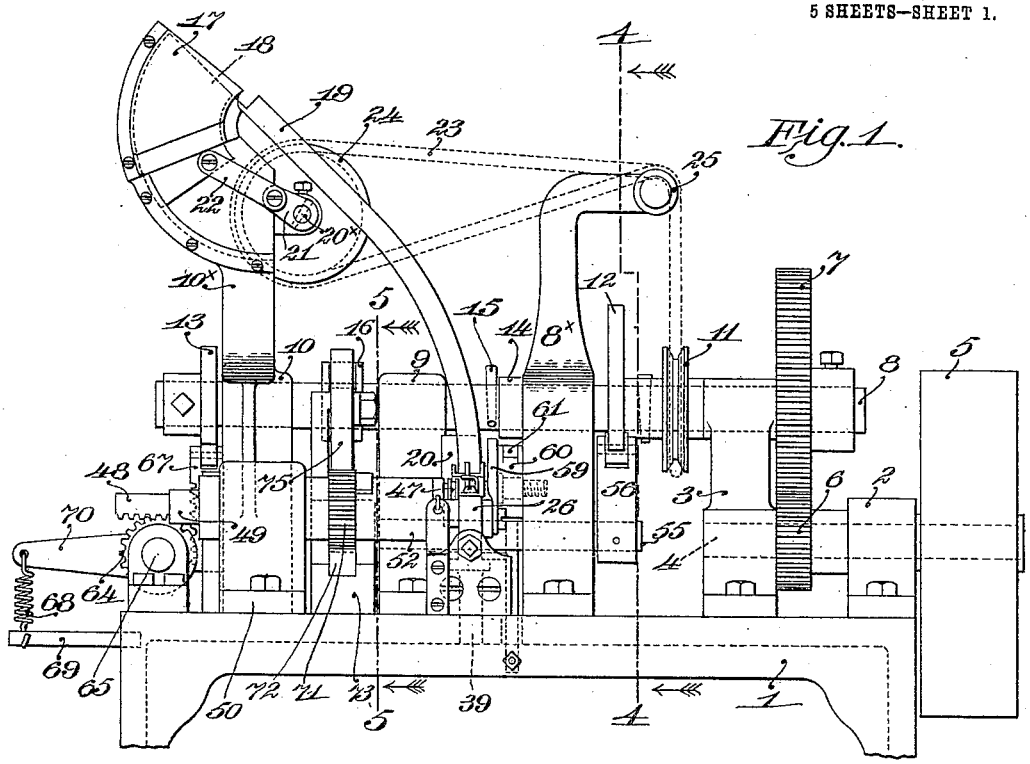
Figure 2:
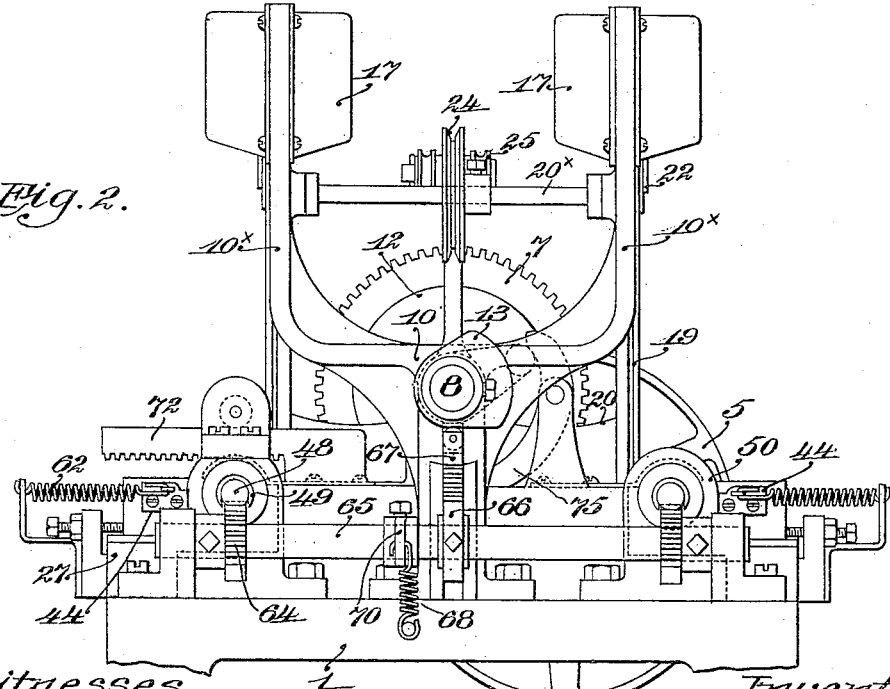
Figure 15:
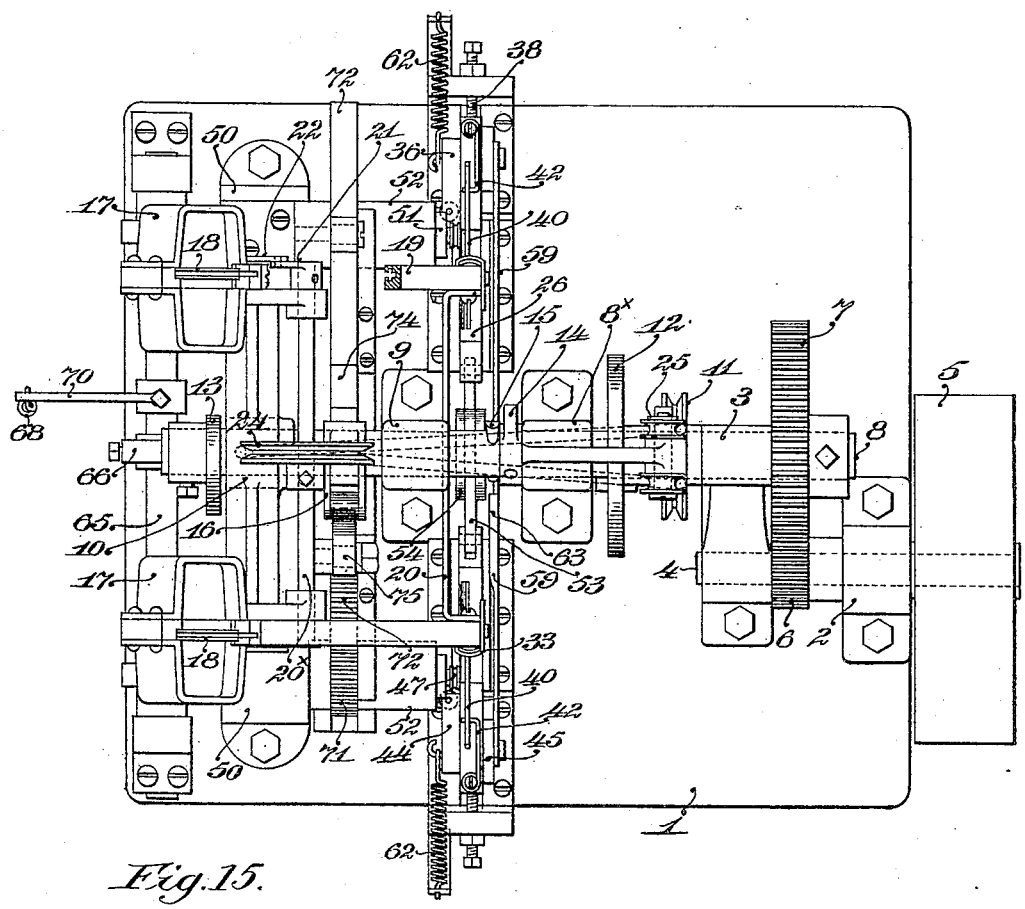

Referring to the drawings Fig. 1 is a view in side elevation of the machine; Fig. 2 is an end elevation thereof looking from the left of Fig. 1; Fig. 3 is a plan view of the machine; Fig. 4 is a sectional view taken on the line 4—4 of Fig. 1; Fig. 5 is a partial sectional view taken on the line 5—5 of Fig. 1; Fig. 6 is a detail sectional view taken on the line 6—6 of Fig. 5 illustrating the construction and arrangement of the various parts of the second bending mechanism which comprises the former and the bending device for bending the body portion of the blank around the former. Figs. 7 to 14 inclusive are detail views illustrating the manner in which a blank is fed from one of the raceways into a position to be acted upon by one of the sets of bending devices, the manner in which it is held in such position, and the manner in which the bending devices act upon the body portion of the blank, Figs. 7 and 8 showing the feeding plunger and first bending devices in side elevation, Figs. 9, 10 and 11 showing these parts in plan, and Figs. 12, 13 and 14 showing the former, the second bending device and the sleeve upon which it is mounted in end elevation, and Fig. 15 is a detail view of a completed hook.

1 indicates the base plate of the machine frame to which are secured two standards 2 and 3 provided with bearings for the driving shaft 4. Secured to the driving shaft are a driving pulley 5 and a gear 6, the gear 6 meshing with a gear 7 upon the cam shaft 8 journaled in the standard 3 and in standards $8^x$, 9, and 10 secured to the base plate 1. Upon the cam shaft 8 are secured a belt pulley 11, cams 12 and 13 and arms 14, 15 and 16 from which, through suitable connections, the various parts of the machine are actuated.

The hoppers into which the blanks are placed in bulk are indicated at 17 and are supported upon arms $10^x$ projecting upwardly and laterally from the standard 10. A blank lifting plate 18 is arranged to reciprocate through a slot in the bottom of each hopper being mounted in arc-shaped guideways on the arms $10^x$ and on the front and rear walls of the hopper. Each plate 18 is either made up of two plates separated so as to leave a space between them or is provided in its upper edge with a deep groove so as to receive the body portion of a blank and to support and lift the blank by engaging with the collar on the upper end of the shank. Leading from each hopper is a raceway 19 the upper ends of the raceways being secured to the hoppers and the lower ends being secured to a cross-bar 20 secured to the standard 9. Each raceway is provided with a groove the shape of which is indicated in Fig. 3 in which one of the raceways is shown in cross-section. These grooves receive the shank portions and collars of the blanks and guide and support the blanks during their movement down the raceways into a position to be acted upon by the feeding plungers. The plates 18 are oscillated so as to pass through the blanks in the hoppers and bring the blanks which are lifted by the plates into a position to slide down the upper edges of the plates into the grooves in the raceways. The plates are oscillated from a shaft $20^x$ journaled in bearings in the arms $10^x$ by means of cranks 21 and connecting links 13

22, a constant rotation being imparted to the shaft 20ˣ by means of the belt 23 passing over the pulley 11, a pulley 24 upon the shaft 20ˣ, and guide pulleys 25.

The lower end of each raceway 19 is located just above a reciprocating feeding plunger 26 mounted to slide in a guideway in a block 27 secured to the base plate 1 and held therein by angle bars 28. The feeding plunger is cut away at its forward end upon its upper surface to form a seat in which the blank which is fed from the raceway rests. A block 29 is set in a recess in the side of the plunger and forms that portion of the plunger which directly engages the blanks whereby this portion of the plunger may be readily removed for repair. The upper surface of the plunger and the seat at the forward end of the plunger are provided with a groove 30 to receive the collars of the blanks and with a groove 31 which coöperates with a discharging device to be hereinafter described. When the feeding plunger is in its retracted position as illustrated in Fig. 7, the lowermost blank in the raceway rests upon the seat at the forward end of the plunger, the shank portion of the blank being supported by the plunger, the collar of the blank being received in the groove 30 and the body portion of the blank being supported by a plate 32 secured to the lower end of the raceway. When the plunger is advanced into the position indicated in Fig. 8, the blank in the seat of the plunger is fed into a position to be acted upon by the bending mechanisms and the lowermost blank of the blanks remaining in the raceway is allowed to fall upon the upper surface of the plunger. To insure the proper action of the feeding plunger in feeding the blanks, a separating device is provided at the lower end of the raceway. This separating device consists of a plate 33 pivoted upon the raceway and provided with a curved arm 34 extending around the raceway into a position to engage the body portion of the blanks projecting therefrom. The arm 34 is provided with two projecting points which as the escapement device is oscillated alternately engage the body portion of a hook, each complete oscillation of the escapement device allowing a blank to fall upon the feeding plunger as will be readily understood from an inspection of Figs. 7 and 8. The escapement device is oscillated by means of a pin 35 projecting from the plunger into a position to engage downwardly projecting portions of the plate 33 during the forward and backward reciprocating movements of the plunger as is clearly illustrated in Figs. 7 and 8.

The blank is held in a position to be acted upon by the bending devices by means of the feeding plunger and a stationary holding device consisting of a seat formed in an overhanging portion of a block 36 mounted in a guideway in the base plate 1 and held in position by clamping plates 37 and an adjustable stop screw 38. The seat in the block 36 is provided with a groove to receive the collar of the blank and the blank is forced against this seat and securely held in position by the feeding plunger when the plunger reaches the end of its forward movement. When the blank is in this position its body portion projects beyond the lateral faces of the plunger block 29 and the block 36 into a position to be acted upon by the bending mechanisms as is clearly indicated in Fig. 9. After the bending mechanisms have acted upon the body portion of the blank to form a hook the feeding plunger returns to its initial position indicated in Fig. 7. In order to remove the hook from the seat in the feeding plunger and allow it to drop out of the machine through the opening 39 formed in the block 27 and base plate 1 the discharging device 40 is provided which as shown consists of a lever pivoted upon the block 36 and provided with a notch 41 arranged to engage the shank portion of the hook during the backward movement of the feeding plunger. The lever 40 is acted upon by a spring 42 and is held by the spring during the backward movement of the plunger in a position in which the end of the lever beyond the notch 41 enters the groove 31 of the plunger. The lever 40 also acts to hold the blank in position on the seat on the feeding plunger while the blank is being fed from the raceway into a position to be acted upon by the bending devices, the surface of the lever beyond the notch 41 bearing upon the shank portion of the blank during the feeding movement of the plunger. While the blank is held in position between the feeding plunger and the seat in the block 36 with its body portion projecting as indicated in Fig. 9, it is acted upon successively by two bending mechanisms, the first of which acts to bend the body portion of the blank into a plane substantially at right angles to the shank as indicated in Figs. 10 and 11, and the other of which acts to bend the blank so as to form therein a curvature angularly disposed to the first curvature as indicated in Figs. 13 and 14. The first of these bending mechanisms comprises a roller 43 journaled in the end of a block 44 secured to a slide 45 mounted to reciprocate in a slot in the block 36. The slide 45 is arranged to reciprocate at right angles to the axis of the blank when held as indicated in Fig. 9 and is reciprocated at the proper time during the operation of the machine to cause the roller 43 to engage the body portion of the blank and bend it into a position substantially at right angles to the shank as will be clearly understood from an inspection of Figs. 9 and 10. The second bending mechanism comprises a former 46 and a bending roll 47 which is rotated partially around the former so as to bend the body portion of the blank around the same as indicated in Figs. 12 and 13 and is then returned to its original position as indicated in Fig. 14. The former 46 is carried upon the end of a plunger 48 (see more particularly Fig. 6), the shank of the former having a driving fit in a hole in the end of the plunger and extending into a transverse hole which allows for the insertion of a tool to remove the former if desired when the plunger is removed from the machine. The plunger 48 is mounted to reciprocate longitudinally in a sleeve 49 rigidly secured in a standard 50 secured to the base plate 1 and is actuated at the proper times during the operation of the machine to bring the former 46 into a position to be engaged by the body portion of the blank as indicated in Fig. 11 and to return the former to its original position after the hook has been completed. The roller 47 is journaled upon a stud projecting from a plate 51 secured to the end of a sleeve 52 mounted to rotate upon the projecting end of the sleeve 49. The sleeve 52 is rotated to bring the roller 47 into contact with the body portion of the blank after the former has been moved into the position indicated in Fig. 11 and to bend the blank around the former and is then rotated in the opposite direction to return the roller 47 to its original position. It will be noted that the roller 47 is moved in a path eccentric to the former and that as a result the roller engages the body portion of the blank at its outer end and thus acts to the best advantage in bending the blank around the former.

The feeding plungers 26, the slides 45, the former carrying plungers 48 and the sleeves 52 are actuated from the cams and arms on the cam shaft 8 as follows:—The feeding plungers 26 are connected by means of links 53 to the opposite ends of an arm 54 secured to a rock shaft 55 journaled in bearings in the standards 8$^x$ and 9. Also secured to the rock shaft 55 is an arm 56 provided at its upper end with a roll arranged to bear against the periphery of the cam 12 upon the cam shaft 8. The above-described connections between the cam 12 and the feeding plungers are so arranged that the cam acts to positively actuate the plungers to feed blanks from the raceways into a position to be acted upon by the bending devices. The plungers are returned to their initial position by means of a coiled spring 57 one end of which is connected to the base plate 1 and the other end of which is connected to the free end of an arm 58 secured to the rock shaft 55 and projecting downwardly through a slot in the base plate.

Each slide 45 is connected by means of a link 59 to a disk 60 pivotally mounted upon the standard 8$^x$, the links being pivotally connected to the disk at diametrically opposite points. The disk 60 is provided with a projecting lug in which is journaled a roll 61 arranged in the path of movement of the arm 14 on the cam shaft 8. During the rotation of the cam shaft the arm 14 engages the roll 61 and rocks the disk 60 about its pivot, thereby reciprocating the slides 45 to cause the rollers 43 to impart the first bend to the body portions of the blanks. Coiled springs 62 connected at one end to brackets secured to the blocks 27 and at the other end to the blocks 44 tend to return the slides 45 to their initial position. In order to insure the return of the slides in case the springs 62 fail to act one of the links 59 is provided with an arm 63 which is arranged to be engaged by the arm 15 secured to the cam shaft 8 after the arm 14 has become disengaged from the roll 61.

Each of the plungers 48 is provided at its rear end, which projects beyond the stationary sleeve 49, with a rack which is engaged by the teeth of a mutilated gear 64. The mutilated gears 64 are secured to a rock shaft 65 mounted in bearings in blocks secured upon the base plate 1. A mutilated gear 66 is also secured to the rock shaft 65 which meshes with a rack 67 upon a slide mounted to reciprocate vertically in guideways on the standard 10. The upper end of the slide 67 is provided with a roll which bears against the periphery of the cam 13 secured to the cam shaft 8. Through the connections above described the cam 13 acts to positively actuate the plungers 48 to bring the formers 46 into a position to be engaged by the body portions of the blanks. The plungers are returned to their initial position by means of a coiled spring 68 one end of which is connected to a rod 69 projecting from the base plate 1 and the other end of which is connected to an arm 70 rigidly secured to the rock shaft 65.

Each sleeve 52 is provided with a gear 71 formed integrally therewith. These gears mesh with racks formed upon a slide 72 mounted to reciprocate in a guideway formed in a block 73 upon the base plate 1, one rack extending beneath one of the gears 71 and the other rack extending above the other gear 71, the construction being such that a reciprocation of the slide 72 rotates the sleeves 52 simultaneously in opposite directions. The slide 72 is provided with a notch 74 (see more particularly Fig. 5) with which a roll at the outer end of the arm 16 secured to the cam shaft 8 engages during the rotation of the cam shaft so as to reciprocate the slide 72 in one direction. The slide 72 is reciprocated in the other direction by means of a lever 75 pivoted upon a bracket secured to the block 73. The lower end of this lever is provided with a roll arranged to bear against a shoulder of the slide 72 and its upper end is provided with a laterally extending pin 76. The pin 76 is arranged to be engaged by the arm 16 during the rotation of the cam shaft 8 and the upper end of the lever 75 is arranged to be engaged by the roller at the outer end of the arm 16, the initial movement of the lever to reciprocate the slide 72 being produced by the engagement of the arm with the pin 76 and the movement being completed by the engagement of the roll with the lever. The operation of this mechanism will be fully understood from an inspection of Fig. 5 which shows in dotted lines the position of the parts when the slide 72 is in its extreme position at the left and the arm 16 has engaged the pin 76 and in full lines the position of the parts when the slide 72 is in its extreme position at the right and the roll on the arm 16 is in engagement with the end of the lever 75.

The operation of the various parts of the machine has been fully indicated in connection with the description given above of their construction and relative arrangement and will be readily understood without a separate description thereof. It will be noted that the corresponding parts of the two sets of bending mechanisms are operated simultaneously in the same manner with the exception that one bending roller 47 is rotated around its associated former in one direction while the other roller 47 is rotated around its associated former in the opposite direction, so that one set of bending mechanisms acts to form a right hook and the other set of bending mechanisms acts to form a left hook.

Having thus described my invention, I claim as new and desire to secure by Letters Patent of the United States.

1. A machine for bending lacing hook blanks which comprise a body portion and a shank portion, having, in combination means for holding the shank portion of a blank, bending devices, and means for actuating said devices to engage the body portion of a blank and form therein two curvatures, angularly disposed with relation to each other, substantially as described.

2. A hook bending machine for bending lacing hook blanks which comprise a body portion and a shank portion, having, in combination, means for holding a blank and a plurality of bending mechanisms arranged to act successively upon the body portion of a blank and form therein two curvatures angularly disposed with relation to each other, substantially as described.

3. A hook bending machine for bending lacing hook blanks which comprise a body portion and a shank portion, having, in combination, means for holding the shank portion of a blank, means for engaging and bending the body portion of a blank at an angle to the shank, and means for thereafter engaging the body portion of the blank and bending it to form a curvature therein angularly disposed with relation to the first curvature, substantially as described.

4. A hook bending machine for bending lacing hook blanks which comprise a body portion and a shank portion, having, in combination, holding devices arranged to hold a blank with its body portion projecting beyond the same, a bending device, means for actuating the bending device to bend the body portion of the blank at an angle to the shank, and means for thereafter bending the body portion of the blank to form therein a curvature angularly disposed with relation to the first curvature, substantially as described.

5. A hook bending machine for bending lacing hook blanks which comprise a body portion and a shank portion, having, in combination, holding devices arranged to hold a blank with its body portion projecting beyond the same, a bending device, means for actuating the bending device to bend the body portion of the blank at an angle to the shank, a former, a bending device for bending the body portion of the blank around the former to form therein a curvature angularly disposed with relation to the first curvature, and means for actuating said last-mentioned bending device, substantially as described.

6. A hook bending machine for bending lacing hook blanks which comprise a body portion and a shank portion, having, in combination, holding devices arranged to hold a blank with its body portion projecting beyond the same, a bending device, means for actuating the bending device to bend the body portion of the blank into a plane substantially at right angles with the shank, a former, means for moving the former into a position to be engaged by the body portion of the blank, a bending device for bending the body portion of the blank around the former, and means for rotating said last-mentioned bending device around the former, substantially as described.

7. A hook bending machine for bending lacing hook blanks which comprise a body portion and a shank portion, having, in combination, a former, means other than the former for holding a blank with its body portion in position to engage the former, a bending device for bending the body portion only of the blank around the former, and means for rotating the bending device around the former, substantially as described.

8. A hook bending machine for bending lacing hook blanks which comprise a body portion and a shank portion, having, in combination, a former, means other than the former for holding a blank with its body portion in position to engage the former, a bending device for bending the body portion only of the blank around the former, and means for rotating the bending device around the former in a path eccentric to the former, substantially as described.

9. In a hook bending machine for bending lacing hook blanks which comprise a body portion and a shank portion, having, in combination, a rotary sleeve, a bending device on the end of the sleeve, a plunger movable longitudinally in the sleeve, a former carried by the plunger, means other than the former for holding a blank with its body portion in position to be bent around the former, means for actuating the plunger to project the former into a position to be engaged by the body portion of the blank and to withdraw it from such position, and means for rotating the sleeve to cause the bending device to bend the body portion only of the blank around the former, substantially as described.

10. A hook bending machine for bending lacing hook blanks which comprise a body portion and a shank portion, having, in combination, bending mechanism acting to bend the body portion of a blank to form a hook, a raceway for the blanks, a feed plunger for feeding blanks from the raceway, and means coöperating with the feed plunger for holding the blank with its body portion in position to be acted upon by the bending mechanism, substantially as described.

11. A hook bending machine, having, in combination, bending mechanism acting to bend the body portion of a blank to form a hook, a raceway for the hooks, a support at the end of the raceway for the body portion of a hook, a feed plunger arranged to support the shank of the hook, means coöperating with the plunger for holding the blank with its body portion in position to be acted upon by the bending mechanism and a device arranged to hold the blank upon the plunger during its feeding movement and to discharge the hook during its return movement, substantially as described.

12. A hook bending machine, having, in combination, bending mechanism acting to bend the body portion of a blank to form a hook, a raceway for the blanks, a feed plunger for feeding blanks from the raceway, means coöperating with the feed plunger for holding the blank with its body portion in position to be acted upon by the bending mechanism, and a discharging device arranged to remove the hook from the plunger, substantially as described.

In testimony whereof I affix my signature, in presence of two witnesses.

HARRISON H. EATON.

Witnesses:
   FRED O. FISH,
   HORACE VAN EVEREN.